United States Patent Office 3,320,047
Patented May 16, 1967

3,320,047
HERBICIDAL COMPOSITION AND METHOD
Everett E. Gilbert, Morris Township, Morris County, N.J., assignor to Allied Chemical Corporation, New York, N.Y., a corporation of New York
No Drawing. Filed Dec. 16, 1963, Ser. No. 330,545
10 Claims. (Cl. 71—2.7)

This invention relates to new fluorohemiketal herbicides and to methods for effecting deterioration or destruction of undesired vegetation in which such herbicides are employed.

Certain fluorohemiketal compounds have been found to be effective plant growth regulating or growth preventing chemicals. These fluorohemiketals are generally used as nonselective herbicides but may, in some instances, be utilized as selective herbicides having excellent preemergence weed control.

The principal object of the present invention is to provide new fluorohemiketal herbicides. Another object of the present invention is to provide herbicidal compositions containing the fluorohemiketals as active ingredients. Still a further object is to provide a method to effect deterioration or destruction of undesirable vegetation by employing fluorohemiketal herbicides. Other objects and advantages will become apparent from the following description.

In accordance with the present invention, undesirable vegetation may be destroyed or effectively deteriorated by applying to said vegetation, in phytotoxic concentration, a compound having a formula selected from the group consisting of:

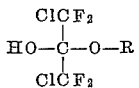

wherein R is alkyl having 1 to 3 carbon atoms,

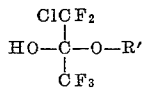

wherein R' is alkyl having 1 to 4 carbon atoms, and

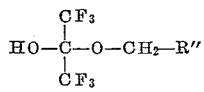

wherein R'' is a member selected from the group consisting of hydrogen and alkyl having 1 to 11 carbon atoms.

These fluorohemiketals are readily prepared by admixing the corresponding fluorinated acetone with a nonsubstituted saturated monohydric aliphatic alcohol. The fluorinated acetone compounds which react with monohydroxy aliphatic alcohols to produce effective herbicidal compounds are sym-tetrafluorodichloroacetone, pentafluorochloroacetone and hexafluoroacetone. The alcohols utilized as reactants with these fluorinated acetones are nonsubstituted saturated monohydric aliphatic alcohols having up to 12 carbon atoms. Illustrative of the monohydric aliphatic alcohols are the following: methanol, ethanol, isopropanol, n-propanol, n-butanol, isobutanol, n-amyl alcohol, isoamyl alcohol, n-hexanol, n-decanol and n-lauryl alcohol.

Generally speaking, the fluorohemiketals are formed by reacting an equimolar amount of alcohol with a fluorinated acetone. However, in some instances, it has been found, as in the case of tetrafluorodichloroacetone and isopropanol, that more than 1 mol of alcohol reacts with one mol fluorinated acetone employed. Thus, effective fluorohemiketral herbicidal compounds have been produced by reacting 2 mols of isopropanol with 1 mol of tetrafluorodichloroacetone. Although it is not fully understood, it has been found that the reaction of sym-tetrafluorodichloroacetone with an alcohol having more than 3 carbon atoms produces a fluorohemiketal which is inactive as a herbicide. Similarly, it has been found that a fluorohemiketal produced by reaction of pentafluorochloroacetone and an alcohol having more than 4 carbon atoms also results in an ineffective herbicidal compound. In sharp contrast, however, are the fluorohemiketals derived from hexafluoroacetone and alcohols having up to 12 carbon atoms which have been found to exhibit outstanding herbicidal activity.

These fluorohemiketal compounds may be applied as herbicides "as is" or, more practically, in the form of herbicidal compositions which are prepared by incorporating the fluorohemiketal compound, as active ingredient, in a suitable liquid or solid diluent or carrier. Surface-active agents which enhance wetting, spreading and penetration properties are desirably incorporated in the compositions.

Herbicidal compositions of fluorohemiketals may be readily prepared by employing a liquid carrier in concentrations as small as 0.25 part by weight fluorohemiketal compound per 100 parts by weight carrier depending upon the particular use. Although water is the preferred liquid dispersion medium, other liquid carriers such as aromatic and paraffinic oils, and glycols may be employed. Dispersants such as the aforementioned nonaqueous carriers are commonly used for dormant application.

Solid carriers may also be utilized and may be in finely divided or granular form. Typical solid diluents include diatomaceous earth, wood flours, silica gels, corn-cob grits and vermiculite. Concentrations as small as 0.25 part by weight fluorohemiketal per 100 parts by weight solid diluent may be successfully employed.

The fluorohemiketal compounds of the present invention are generally useful as nonselective herbicides for control of established broadleaf or dicotyledonous varieties of plants such as smartweed, rape, lambsquarters, bindweed, horsenettle, Canada thistle, and broadleaf plantain; control of established more pernicious monocotyledonous plants and grasses such as ryegrass, foxtail, crabgrass and nutgrass, Johnson grass, orchard grass, meadow grass and *panicum* species. The fluorohemiketal herbides are also useful to provide complementary rapid herbicidal action when used in combination with slower acting herbicides.

Certain fluorohemiketal compounds of the present invention have been found to exhibit selective herbicidal properties. In other words, when the herbicide or herbicidal composition is applied to a locus wherein crop plants and weeds are present, it has been found that outstanding weed control with very light crop plant damage has been effected. For example, in the case of the fluorinated hemiketals prepared from sym-tetrafluorodichloroacetone, negligible crop injury is sustained particularly in pre-emergence treatment while excellent control of weeds is secured.

Whether used for selective or nonselective control, the herbicides of the present invention may be applied to the vegetation to be treated in amounts (pounds per acre) sufficient to afford the degree of control of vegetation desired in the given area. Application to vegetation includes application to vegetation per se in the case of post-emergence treatment or to the locus in the case of pre-emergence use. Optimum intensity of application will depend upon such factors as amount of vegetation in the area; degree of permanency of plant eradication desired; type of plants growing in the area and climatic conditions; and whether the objective is nonselective or selective control. Hence, applications employed depend largely on prevailing local conditions. In most instances, pre-emergence control of germinating weed seeds and small weed seedlings may be had by applying the fluorohemiketal at a rate of 2 pounds and upwards, more usually 8 to 16 pounds per acre. If selectively is desired, the dosage is preferably not more than 8 pounds per acre. Where prolonged nonselective control of established vegetation is desired, particularly in the defoliation and killing of dense undergrowth, greater dosages up to about 25 pounds per acre may be employed. Depending mostly upon local conditions and sought-for overall results, selections of dosages and fluorohemiketal concentrations in sprays, granules and dusts are within the skill of the art.

The following examples illustrate typical preparation of fluorohemiketals of the present invention. In the examples, parts are by weight.

EXAMPLE 1

Into a suitable reaction vessel were charged 12 parts of n-propanol. 33.2 parts of hexafluoroacetone, in gaseous form, were bubbled into the reaction vessel at room temperature. The reaction temperature increased 20° C. indicating that the reaction was inherently exothermic. An additional 5 parts of hexafluoroacetone were added and the resulting reaction mixture was heated at a temperature of about 50° C. 44 parts of hexafluorohemiketal as a water-white liquid, corresponding to a yield of 97.5% of theory, were obtained.

EXAMPLE 2

To the reaction vessel of Example 1 were charged 3.2 parts of methanol followed by the addition of 19.9 parts of sym-tetrafluorodichloroacetone at room temperature. The reaction temperature increased 20° C. The reaction mixture was then heated to a temperature of 50° C. followed by cooling by external means to room temperature. 20 parts of sym-tetrafluorodichlorohemiketal as a water-white liquid, corresponding to a yield of 86.5% of theory, were obtained.

EXAMPLE 3

To the reaction vessel of Example 1 were charged 18.2 parts of liquid pentafluorochloroacetone at a temperature of 0° C. followed by the dropwise addition of 4.6 parts of ethanol. The reaction temperature increased 20° C., 22 parts of pentafluorochlorohemiketal as a pink liquid, corresponding to a yield of 96.5% of theory, were obtained.

The following examples illustrate use of fluorohemiketal compounds of this invention as effective herbicides. In the examples the fluorohemiketals are admixed with acetone as a liquid dispersion medium. Pre-emergence and post-emergence test procedures employed are described by Shaw and Swanson in "Weeds," vol. 1, No. 4, p. 352 (July 1962). This publication describes the effect of herbicidal compositions in terms of an injury rating based on a ten-unit system. The injury rating (IR) is designated as follows: 0=none; 1 to 3=slight; 4 to 6=moderate; 7 to 9=severe and a value of 10=killed.

EXAMPLES 4 to 6

Pre-emergence greenhouse tests were carried out employing the macro-screening technique described by Shaw and Swanson (supra). The fluorohemiketal herbicidal composition consisted of various amounts of fluorohemiketal dissolved in 40 gallons of acetone per acre to be treated.

Test plot crops were corn, cotton, wheat and soybeans. Test plot weeds of ryegrass, representative of grassy weeds, and rape, representative of broadleaf weeds, were also used. The results are set forth below in Table I.

The data below indicate the excellent weed-kill capabilities of tetrafluorodichlorohemiketals derived from

TABLE I

| Vegetation | Fluorohemiketal | | | | |
| --- | --- | --- | --- | --- | --- |
| | 4FK–methanol | | 4FK–ethanol | | 4FK–isopropanol (1 mol 4FK/2 mols isopropanol) 16 lbs./acre |
| | 16 lbs./acre | 8 lbs./acre | 4 lbs./acre | 16 lbs./acre | |
| Corn: | | | | | |
| IR | 4 | 1 | 0 | 3 | 2 |
| HR, percent | 33 | N.D. | N.D. | 28 | 20 |
| PK, percent | 6 | 7 | 0 | 6 | 12 |
| Cotton: | | | | | |
| IR | 2 | 1 | 4 | 2 | 4 |
| HR, percent | 23 | N.D. | N.D. | 6 | 23 |
| PK, percent | 16 | 0 | 0 | 16 | 43 |
| Wheat: | | | | | |
| IR | 3 | 2 | 0 | 4 | 2 |
| HR, percent | 25 | N.D. | N.D. | 25 | 7 |
| PK, percent | 26 | 1 | 0 | 28 | 15 |
| Soybean: | | | | | |
| IR | 4 | 5 | 2 | 3 | 5 |
| HR, percent | 35 | N.D. | N.D. | 31 | 25 |
| PK, percent | 20 | 13 | 0 | 10 | 53 |
| Ryegrass: | | | | | |
| IR | 9 | 9 | 6 | 9 | 9 |
| PK, percent | 90 | 90 | 60 | 90 | 90 |
| Rape: | | | | | |
| IR | 9 | 9 | 6 | 8 | 8 |
| PK, percent | 90 | 95 | 95 | 78 | 83 |

4FK = Sym-tetrafluorodichloroacetone.
IR = Injury rating.
HR = Height reduction.
PK = Plant kill.
N.D. = Not determined.

methanol, ethanol and isopropanol while effecting only moderate crop damage.

Fluorohemiketals derived from pentafluorochloroacetone were tested in accordance with the procedure of Shaw and Swanson (supra) the results of which are set forth below in Table II.

The pentafluorochlorohemiketals derived from methanol, ethanol, n-butanol and isopropanol exhibited excellent herbicidal properties while causing generally slight to moderate crop damage.

The fluorohemiketals derived from hexafluoroacetone were also tested, the results of which are set forth below in Table III.

TABLE III

| VEGETATION | Fluorohemiketal (16 lbs./acre) | | | | | | |
|---|---|---|---|---|---|---|---|
| | 6FK-ethanol | 6FK-n-butanol | 6FK-iso-butanol | 6FK-n-amyl alc. | 6FK-iso-amyl alc. | 6FK-n-hexanol | 6FK-n-decanol |
| Corn: | | | | | | | |
| IR | 1 | 2 | 3 | 0 | 3 | 1 | 1 |
| HR, percent | 10 | 7 | 11 | 0 | 10 | 6 | 10 |
| PK, percent | 0 | 12 | 18 | 0 | 30 | 0 | 6 |
| Cotton: | | | | | | | |
| IR | 2 | 4 | 6 | 3 | 5 | 4 | 5 |
| HR, percent | 22 | 24 | 57 | 26 | 47 | 36 | 50 |
| PK, percent | 21 | 15 | 0 | 0 | 50 | 15 | 40 |
| Wheat: | | | | | | | |
| IR | 3 | 4 | 4 | 5 | 4 | 4 | 3 |
| HR, percent | 13 | 21 | 11 | 46 | 10 | 13 | 16 |
| PK, percent | 0 | 0 | 0 | 0 | 0 | 0 | 0 |
| Soybean: | | | | | | | |
| IR | 3 | 3 | 3 | 0 | 4 | 4 | 2 |
| HR, percent | 7 | 16 | 21 | 0 | 33 | 17 | 20 |
| PK, percent | 10 | 0 | 0 | 0 | 32 | 0 | 0 |
| Ryegrass: | | | | | | | |
| IR | 9 | 8 | 9 | 9 | 9 | 8 | 9 |
| PK, percent | 93 | 80 | 95 | 90 | 90 | 83 | 85 |
| Rape: | | | | | | | |
| IR | 9 | 8 | 8 | 9 | 8 | 9 | 9 |
| PK, percent | 85 | 88 | 83 | 88 | 80 | 88 | 83 |

6FK=Hexafluoroacetone.

TABLE II

| Vegetation | Flurorohemiketal (16 lbs./acre) | | | |
|---|---|---|---|---|
| | 5FK-methanol | 5FK-ethanol | 5FK-n-butanol | 5FK-isopropanol |
| Corn: | | | | |
| IR | 4 | 2 | 2 | 4 |
| HR, percent | 22 | 17 | 10 | 18 |
| PK, percent | 16 | 0 | 6 | 21 |
| Cotton: | | | | |
| IR | 4 | 5 | 5 | 6 |
| HR, percent | 28 | 28 | 30 | 41 |
| PK, percent | 13 | 17 | 17 | 22 |
| Wheat: | | | | |
| IR | 7 | 6 | 4 | 6 |
| HR, percent | 43 | 33 | 10 | 26 |
| PK, percent | 24 | 27 | 0 | 0 |
| Ryegrass: | | | | |
| IR | 9 | 9 | 9 | 9 |
| PK, percent | 90 | 95 | 95 | 95 |
| Rape: | | | | |
| IR | 8 | 9 | 8 | 9 |
| PK, percent | 83 | 90 | 85 | 88 |

5FK=Pentafluorochloroacetone.

The above hexafluorohemiketal compounds exhibited outstanding weed control properties while causing slight to moderate crop damage.

Particularly outstanding weed control was obtained from the fluorohemiketals derived from the reaction of hexafluoroacetone with methanol and n-isopropanol, as illustrated by the data contained in Table IV, set forth below.

The particular hexafluorohemiketals derived from methanol and n-propanol exhibited nonselective herbicidal activity in that the data indicate substantial crop injury and almost total weed kill capabilities.

Particularly outstanding post-emergence control of broadleaf vegetation was secured by those tetrafluorodichlorohemiketal herbicidals derived from methanol, ethanol and isopropanol as illustrated by the data contained in Table V, set forth below. Once again, these post-

TABLE IV

| Vegetation | Fluorohemiketal (6FK) | | | | | |
|---|---|---|---|---|---|---|
| | Methanol | | | n-Propanol | | |
| | 16 lbs./acre | 8 lbs./acre | 4 lbs./acre | 16 lbs./acre | 8 lbs./acre | 4 lbs./acre |
| Corn: | | | | | | |
| IR | 7 | 4 | 4 | 1 | 5 | 4 |
| HR, percent | 50 | 24 | 41 | N.D. | 9 | 3 |
| PK, percent | 19 | 27 | 21 | N.D. | 43 | 38 |
| Cotton: | | | | | | |
| IR | 8 | 8 | 4 | 10 | 5 | 6 |
| HR, percent | 65 | 58 | 36 | N.D. | 51 | 65 |
| PK, percent | 15 | 32 | 6 | N.D. | 0 | 0 |
| Wheat: | | | | | | |
| IR | 9 | 8 | 2 | 4 | 6 | 6 |
| HR, percent | 63 | 60 | 2 | N.D. | 19 | 25 |
| PK, percent | 36 | 60 | 19 | 40 | 45 | 38 |
| Soybean: | | | | | | |
| IR | 9 | 8 | 5 | 4 | 8 | 8 |
| HR, percent | 64 | 70 | 47 | N.D. | 59 | 71 |
| PK, percent | 34 | 32 | 46 | 40 | 41 | 32 |
| Ryegrass: | | | | | | |
| IR | 10 | 9 | 5 | 2 | 10 | 8 |
| PK, percent | 100 | 94 | 45 | 20 | 100 | 80 |
| Rape: | | | | | | |
| IR | 9 | 9 | 5 | 9 | 10 | 7 |
| PK, percent | 85 | 90 | 45 | 90 | 100 | 70 |

N.O.=Not determined.   6FK=Hexafluoroacetone.

emergence test procedures are those which are described by Shaw and Swanson (supra).

TABLE V.—POST-EMERGENCE CONTROL

| Vegetation | Fluorohemiketal (4FK) | | | | | | | | |
|---|---|---|---|---|---|---|---|---|---|
| | Methanol | | | Ethanol | | | Isopropanol (1 mol 4FK/2 mols isopropanol) | | |
| | 16 lbs./acre | 8 lbs./acre | 4 lbs./acre | 16 lbs./acre | 8 lbs./acre | 4 lbs./acre | 16 lbs./acre | 8 lbs./acre | 4 lbs./acre |
| Corn, IR | 1 | 2 | 0 | 1 | 1 | 0 | 1 | N.D. | N.D. |
| Wheat, IR | 2 | 3 | 1 | 1 | 3 | 2 | 1 | N.D. | N.D. |
| Rape, IR | 9 | 9 | 6 | 9 | 8 | 8 | 8 | N.D. | N.D. |

N.D.=Not determined.

Hexafluorohemiketal herbicides showed outstanding effectiveness against rape weeds while effecting only slight crop damage, as shown in Table VI.

TABLE VI

| Vegetation | Fluorohemiketal (6FK), 16 lbs. per acre | | | | | | |
|---|---|---|---|---|---|---|---|
| | Ethanol | n-Butanol | i-Butanol | n-Amyl alc. | i-Amyl alc. | n-Hexanol | n-Decanol |
| Corn, IR | 1 | 1 | 2 | 2 | 1 | 3 | 3 |
| Wheat, IR | 4 | 4 | 4 | 4 | 4 | 4 | 4 |
| Rape, IR | 8 | 9 | 8 | 9 | 9 | 9 | 9 |

6FK=Hexafluoroacetone.

Of particularly outstanding significance in post-emergence control of broadleaf plants are the fluorohemiketals derived from reaction of hexafluoroacetone with ethanol and n-propanol. The herbicidal test data are set forth below in Table VII.

TABLE VII

| Weeds | Fluorohemiketal (6FK) | | | |
|---|---|---|---|---|
| | Methanol | | n-Propanol | |
| | 16 lbs./acre | 8 lbs./acre | 16 lbs./acre | 8 lbs./acre |
| Ryegrass, IR | 3 | 3 | 2 | 2 |
| Rape, IR | 8 | 5 | 9 | 7 |

Translocation was evident in the above post-emergence tests using herbicides derived from tetrafluorodichlorohemiketals and, even more so, in the use of hexafluorohemiketal herbicides.

The present invention may be embodied in other forms or carried out in other ways without departing from the spirit thereof. The present embodiment is, therefore, to be considered illustrative and not restrictive, the scope of the invention being indicated by the appended claims.

I claim:

1. A method for combating growth of undesirable vegetation which comprises applying to said vegetation in phytotoxic concentration a compound having the formula selected from the group consisting of:

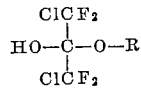

wherein R is alkyl having 1 to 3 carbon atoms,

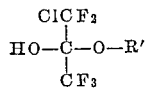

wherein R' is alkyl having 1 to 4 carbon atoms, and

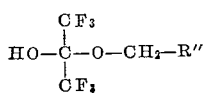

wherein R'' is a member selected from the group consisting of hydrogen and alkyl having 1 to 11 carbon atoms.

2. A method in accordance with claim 1 wherein the compound is:

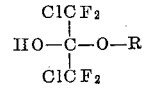

wherein R is alkyl having 1 to 3 carbon atoms.

3. A method in accordance with claim 1 wherein the compound is:

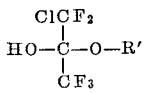

wherein R' is alkyl having 1 to 4 carbon atoms.

4. A method in accordance with claim 1 wherein the compound is:

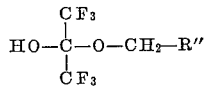

wherein R'' is a member selected from the group consisting of hydrogen and alkyl having 1 to 11 carbon atoms.

5. A method for combating growth of undesirable vegetation which comprises applying to said vegetation a herbicidal composition containing in phytotoxic quantity a compound having the formula selected from the group consisting of:

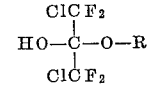

wherein R is alkyl having 1 to 3 carbon atoms,

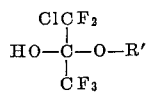

wherein R' is alkyl having 1 to 4 carbon atoms, and

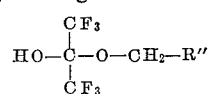

wherein R'' is a member selected from the group consisting of hydrogen and alkyl having 1 to 11 carbon atoms, together with a carrier therefor.

6. A method in accordance with claim 5 wherein a liquid carrier is employed.

7. A method in accordance with claim 5 wherein a solid carrier is employed.

8. A method in accordance with claim 1 wherein the fluorohemiketal compound is utilized in amount of from about 2 pounds to 25 pounds per acre.

9. A herbicidal composition comprised of a compound having the formula selected from the group consisting of:

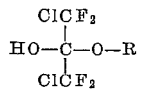

wherein R is alkyl having 1 to 3 carbon atoms,

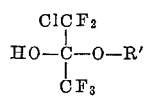

wherein R' is alkyl having 1 to 4 carbon atoms, and

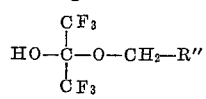

wherein R" is a member selected from the group consisting of hydrogen and alkyl having 1 to 11 carbon atoms, together with a solid carrier and a surface-active agent, said compound being present in phytotoxic concentration.

10. A composition in accordance with claim 9 wherein the compound is present in a concentration by weight of from about 0.25 part to 25 parts per 100 parts carrier.

References Cited by the Examiner

UNITED STATES PATENTS 2,911,414  11/1959  Simmons _____ 167—33

OTHER REFERENCES

Knunyants, et al.: Chemical Abstracts, vol. 54–22484–22485 (1960).

LEWIS GOTTS, *Primary Examiner.*

JAMES O. THOMAS, JR., *Examiner.*

A. J. ADAMCIK, *Assistant Examiner.*